Patented Nov. 28, 1939

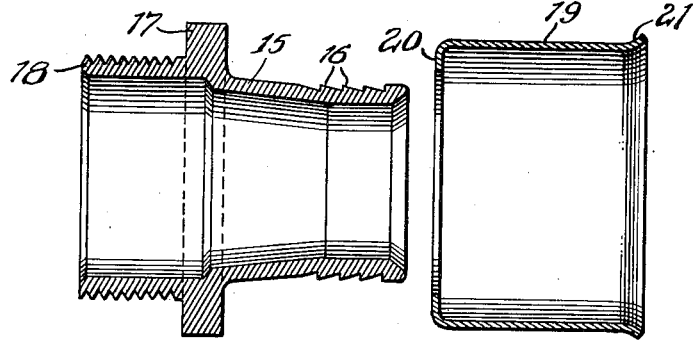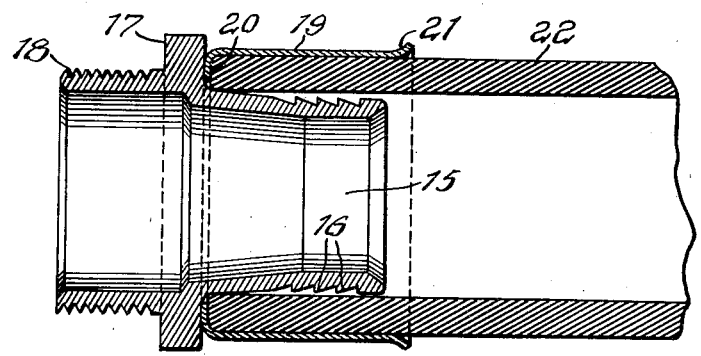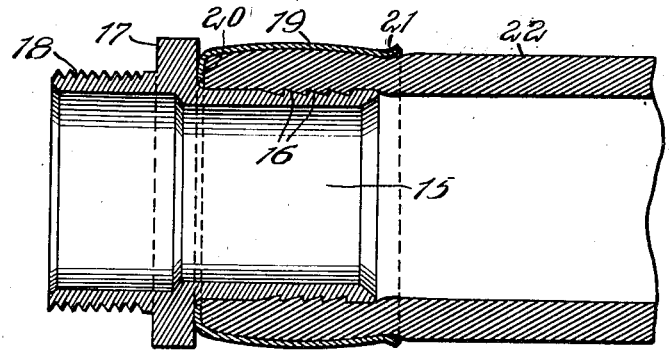

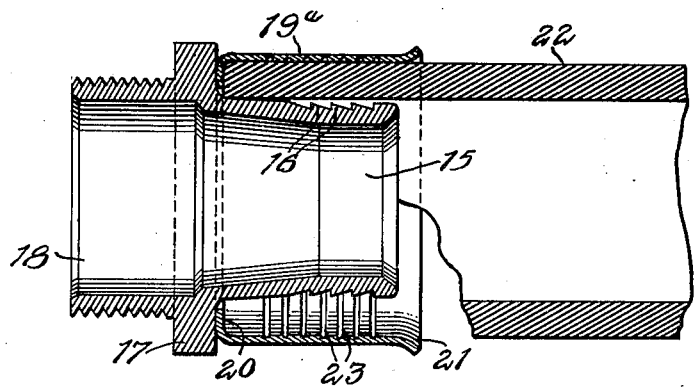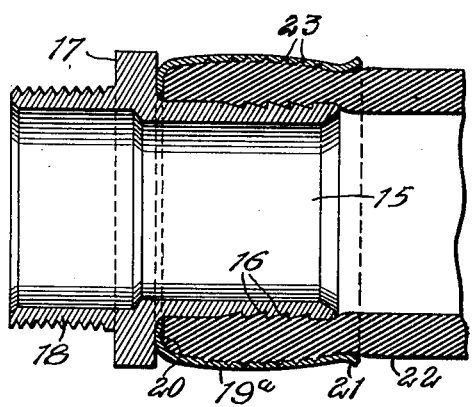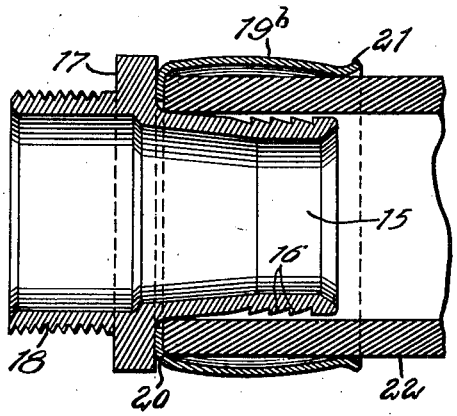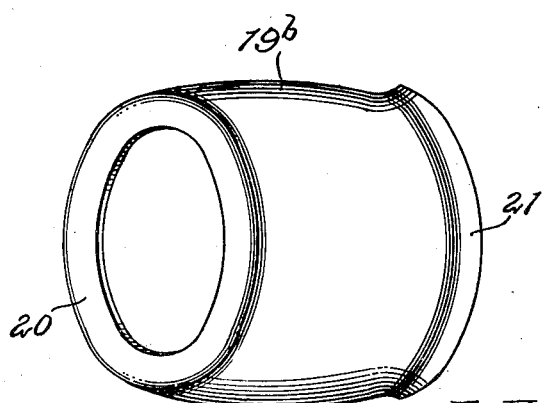

2,181,673

UNITED STATES PATENT OFFICE 2,181,673

DISTORTED SLEEVE COUPLING

Emerson H. Tompkins, Waterbury, Conn., assignor to Scovill Manufacturing Company, Waterbury, Conn., a corporation of Connecticut Application September 27, 1938, Serial No. 232,001

3 Claims. (Cl. 285—84)

The present invention relates to hose couplings of the permanent type, and more particularly to secure and seal a coupling member on the end of a hose.

An object of this invention is to provide a structure adapted to be internally expanded for bulging one portion of the hose and contracting another portion thereof, and prevent the pulling out of the hose from a coupling member by resistance of the bulged portion to passage through the zone of the restricted portion.

Another object is to provide an expansible tapering nipple for insertion in the end of a hose, and a sleeve adapted to surround the hose end and having an intermediate portion for receiving the bulged portion of the hose incident to the expansion of the nipple, and also having a reinforced end to receive the hose compressed thereagainst by the nipple when expanded.

A further object of the invention is to provide a coupling having a particular standard size nipple for insertion in the end of a hose of a predetermined standard internal diameter, and to provide for cooperation with the standard size nipple a set of sleeves varying in diameter according to different wall thicknesses of the hose so that one of the sleeves may be selected according to the external diameter of the hose.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a detail longitudinal section of the inner portion of the nipple of the hose coupling.

Figure 2 is a detail longitudinal section taken through the sleeve or outer portion of the coupling for cooperation with the nipple of Figure 1.

Figure 3 is a longitudinal sectional view taken through the coupling with the end of a hose applied thereto and ready to be secured in the coupling.

Figure 4 is a similar view but showing the coupling expanded and the hose end locked therein.

Figure 5 is a longitudinal section through a slightly modified form of the coupling, showing the hose end therein and ready to be secured in place, the outer member or sleeve having an intermediate weakened portion to facilitate bulging under internal pressure.

Figure 6 is a similar view showing the coupling expanded and secured to the hose end.

Figure 7 is a longitudinal sectional view taken through a further modified form of coupling with a hose end therein, showing the sleeve initially bulged or expanded between its ends, and Figure 8 is a detail perspective view of the modified form of sleeve shown in Figure 7.

Referring now to the drawings, and first to Figures 1 to 4, the coupling comprises an inner part or nipple 15 which preferably is of tapering form for insertion in the end of a hose as shown in Figure 3 and wherein the exterior surface of the nipple 15 may be provided with stepped teeth 16 or the like to facilitate gripping of the inner wall of the hose when the nipple is expanded.

The outer or base end of the nipple 15 is provided with a flange or shoulder 17 which may have wrench receiving peripheral faces to form a nut, and which is provided with a coupling element 18, such as a threaded projection as shown, for interengagement with a nozzle, or another coupling member.

As shown particularly in Figure 2, the coupling member is provided with an outer part 19 in the form of a sleeve or cup which at its outer end has an inturned flange 20 adapted to freely engage over the nipple 15 and abut against the shoulder 17, as shown in Figure 3. The flange 20 reinforces the outer end of the sleeve 19 and prevents it from expanding under internal stress. The opposite or inner end of the sleeve 19 has a flaring or bell mouth 21 which functions not only as a means for guiding the end of the hose into the sleeve and preventing the hose from injury by bending after the hose is secured in the coupling, but which also serves as a reinforcement to prevent the expansion of the inner end of the sleeve 19 when subjected to internal pressure.

As shown in Figure 3, the method of assembling the coupling on the end of a hose comprises the insertion of the tapering nipple 15 into the end of the hose after the sleeve 19 has been slid over the end of the hose so that the shoulder 17 of the nipple abuts the flange 20 while the extremity of the hose engages the inner side of the flange 20. In a suitable and well known manner, the nipple 15 is expanded from the position shown in Figure 3 to that shown in Figure 4 so that the nipple 15 is substantially cylindrical with the teeth or ribs 16 embedded in the inner wall of the hose 22 to prevent the working or squeezing of the hose forwardly over the end of the nipple 15 and from within the bell mouth 21 of the sleeve. Thus the end portion of the hose 22 is confined within the sleeve 19 and as the nipple 15 is expanded the portion of the hose on the nipple is compressed and bulged outwardly with the result that the sleeve is subjected to considerable internal stress or pressure and the intermediate unsupported portion of the sleeve is bulged outwardly as shown in Figure 4, to a slight extent. The opposite ends of the sleeve 19 are held against expansion by the flange 20 and the bell mouth 21 so that the sleeve 19 is permitted to yield only between its ends and the material of the hose end is directed toward and confined to the intermediate portion of the sleeve. The material of the hose thus builds up as the nipple 15 is expanded and the result is that the pressure on the nipple is such that it forces hose material against the sleeve 19 and causes the unsupported intermediate portion of the sleeve to bulge outwardly, thus providing an effective interlock between the hose end and the coupling.

In the modification shown in Figure 5, the sleeve 19ᵃ is provided at its intermediate portion and at its inner side with a plurality of scores, grooves or other weakened portions 23 which weaken the wall of the sleeve 19ᵃ to an extent such that it will freely bulge under internal pressure of the hose end, as shown in Figure 6. These scores, grooves or the like 23 also provide shoulders, teeth or recesses into which the hose material may enter for increasing the effective interlock between the coupling and the hose end.

In the modification shown in Figure 7 the sleeve 19ᵇ may be initially constructed or formed with an intermediate bulged wall as shown. In this instance, when the nipple 15 is expanded the material of the hose end 22 is confined from expansion in the opposite ends of the sleeve but is free to build up or bulge into the bulged portion of the sleeve 19ᵇ, and thus provide the necessary interlock between the hose and the coupling.

A feature of this coupling, shown more clearly in Figure 5, is that the connected end of the nipple 15 adjacent the shoulder or flange 17 is of less wall thickness than the remaining portion of the nipple. This structure is resorted to because the metal of the nipple portion nearer its free end is stretched more by the tool than at the point where the tool starts to enter the tapered section and, further, after the tool has been inserted through the nipple, the inner wall of the nipple is straight or cylindrical throughout but there is quite a taper to the outside wall of the nipple which naturally forms a pocket for a head of rubber at the end of the hose to be compressed after assembly. The result of this construction, also, is that there will be less expansion of the hose at its extremity which lies near the shoulder and, as the thicker portion of the nipple is expanded, the hose will be compressed to a greater extent at the open end of the sleeve, 19ᵃ in Figure 5, and the material of the hose lying about the nipple 15 will be trapped in the sleeve and caused to bulge under the continued expansion of the nipple. This construction may be had in all forms of the invention and the trapping and bulging of the hose material in the sleeve takes place in all instances.

The nipple 15 may be made for a particular internal diameter of hose, and hose are made in standard sizes of internal diameter. However, owing to different wall constructions of hose the different types of hose, while having the same diameter internally, have different external diameters. For this reason several different sized sleeves or cups 19 may be provided for each standard size nipple 15 so that the coupling may be effectively secured to hose of all different standard internal diameters, and with different exterior diameters.

The improved method of securing the coupling member to the end of the hose by expanding the hose at a predetermined point within the sleeve with sufficient force to bulge the hose and the sleeve, is a decided advance step in the art as the hose is compacted under high pressure within the intermediate portion of the sleeve and the built up abutment or enlarged portion of the hose prevents the latter from being drawn out of the sleeve or off from the nipple. The coupling is capable of withstanding very high pressures and the hose is confined about the nipple not only by the enlarged or bulged portion of the hose, but also by the restricted or compressed portion of the hose disposed between the bell mouth 21 of the sleeve and the inner adjacent end of the nipple 15. It will be noted from Figures 4 and 6, particularly, that the sleeve 19 is of slightly greater length than that of the nipple 15 so that the bell mouth 21 of the sleeve is advanced slightly forward from the end of the nipple. This provides the constricted portion in the coupling which compresses and reduces the thickness of the wall of the hose outwardly of the bulged or built up portion of the hose lying within the sleeve 19.

In some forms of the invention, such as illustrated in Figures 1 to 4, the outer part or sleeve 19 may be made of a commercial brass alloy, or other material, which would not permit of the necessary bulging or expansion at the intermediate portion of the sleeve. In such instances it may be necessary to temper or anneal the material of the sleeve so that it will expand or bulge under pressure of the excess hose material built up within the intermediate portion of the sleeve as the inner part or nipple 15 is expanded.

What is claimed is:

1. In a hose coupling, an expansible nipple for insertion in the end of a hose, and a sleeve for engagement about the hose end, said sleeve having reinforcing opposite end portions to prevent expansion of the sleeve, said sleeve having an intermediate weakened wall section, said nipple adapted to be expanded for expanding the hose end in the sleeve and the sleeve resisting expansion of the hose end at opposite ends of the sleeve whereby the continued expansion of the nipple builds up hose material within the sleeve between the ends thereof and causes the intermediate portion of the sleeve to bulge and form an interlock between the coupling and the hose.

2. In a hose coupling, an expansible nipple for insertion in the end of a hose, and a sleeve for engagement about the hose end, said sleeve being reinforced at opposite ends against expansion and being tempered to admit expansion at its intermediate portion, said nipple adapted to be expanded in the hose end to expand the hose in the sleeve and bulge the hose and the intermediate portion of the tempered sleeve to lock the hose end in the coupling.

3. A hose coupling, comprising a body portion having an expanded nipple thereon with a substantially uniform external diameter, a hose end expanded over the nipple, and an outer sleeve surrounding the expanded hose end, said sleeve having an intermediate bulged portion receiving an enlarged and compressed portion of the hose providing a head on the hose and the sleeve having reduced and reinforced ends confining the head of the hose in the sleeve and preventing the pulling of the hose axially off of the nipple.

EMERSON H. TOMPKINS.